UNITED STATES PATENT OFFICE.

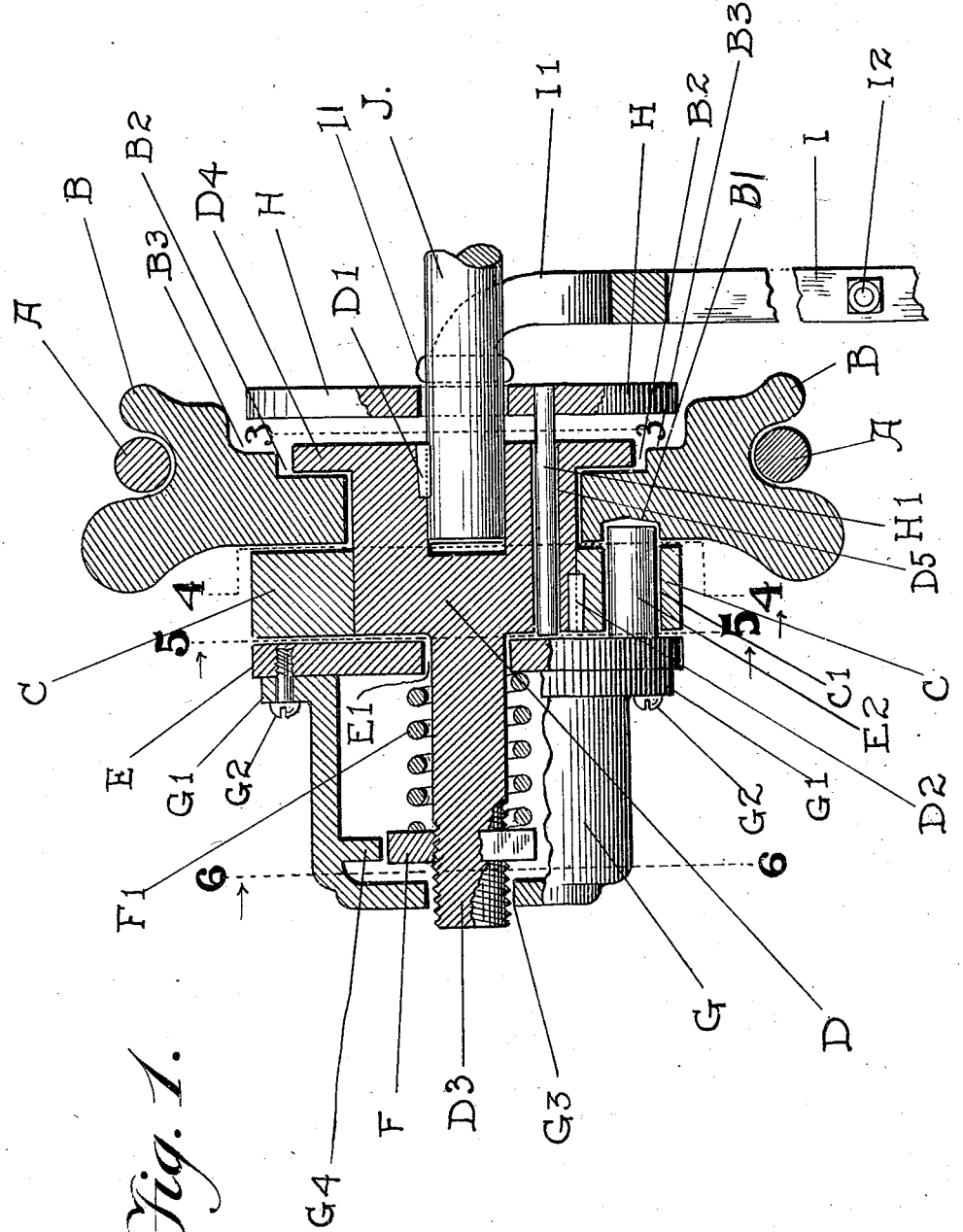

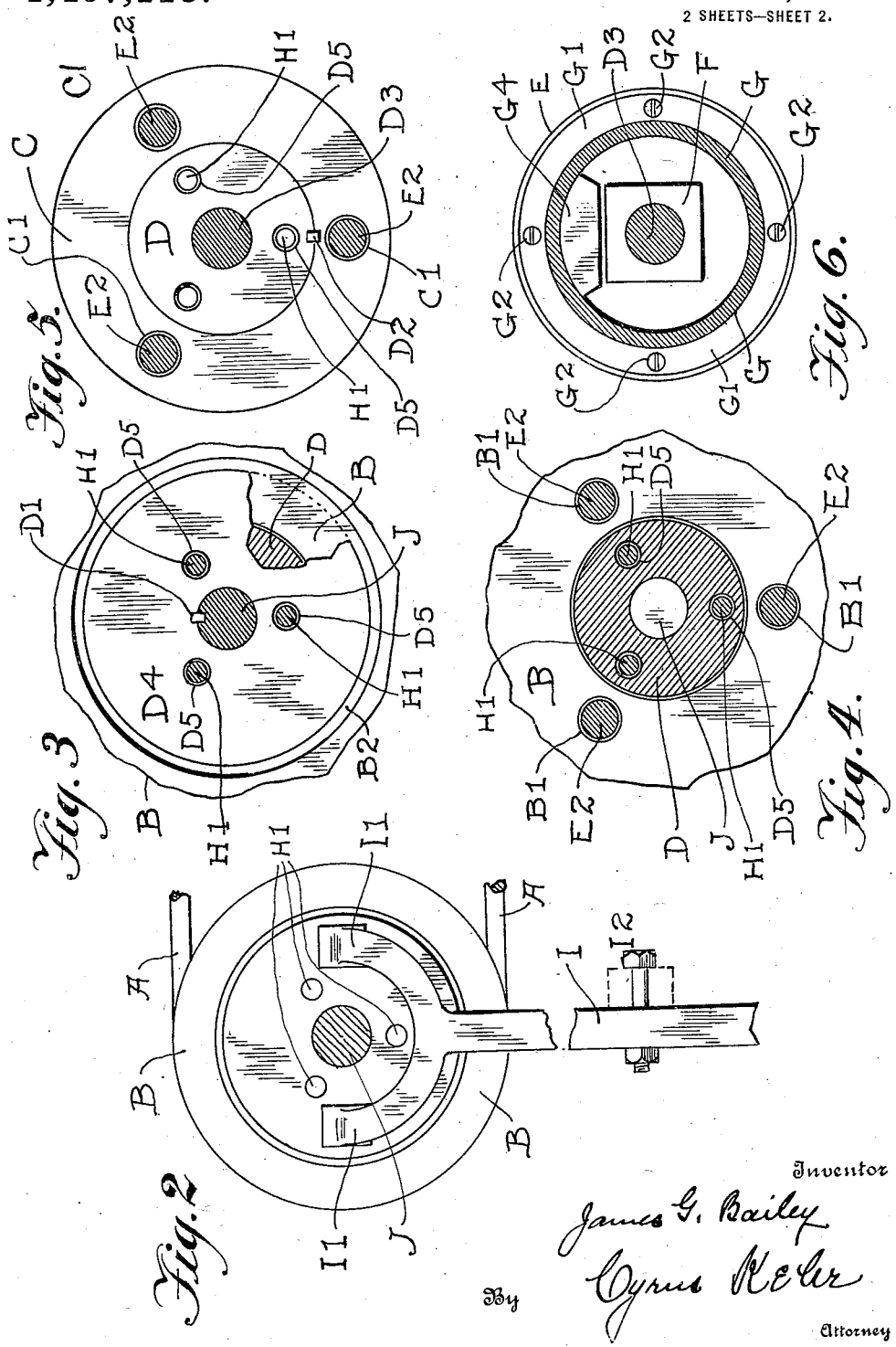

JAMES G. BAILEY, OF KNOXVILLE, TENNESSEE.

CLUTCH.

1,407,115.  Specification of Letters Patent.  Patented Feb. 21, 1922.

Application filed March 28, 1921. Serial No. 456,415.

*To all whom it may concern:*

Be it known that I, JAMES G. BAILEY, a citizen of the United States, residing at Knoxville, in the county of Knox and State of Tennessee, have invented a new and useful Improvement in Clutches, of which the following is a specification, reference being had to the accompanying drawing.

This invention relates to the type of clutches comprising disks which are transverse to the clutch axis and which make inter-engagements by means of pins or fingers and apertures arranged parallel to the clutch axis.

The object of the invention is to produce a clutch which will serve for the transmission of relatively high velocity and which may be quickly engaged and disengaged and stop the shaft to which power is transmitted.

In the accompanying drawings,

Fig. 1 is a longitudinal section of a clutch embodying my improvement;

Fig. 2 is an elevation looking at the structure of Fig. 1 from the right;

Fig. 3 is a section on the line, 3—3, of Fig. 1, looking toward the left;

Fig. 4 is a section on the line, 4—4, of Fig. 1, looking toward the right;

Fig. 5 is a section on the line, 5—5, of Fig. 1, looking toward the right;

Fig. 6 is a section on the line, 6—6, of Fig. 1, looking toward the right.

Referring to the drawings, J, is a horizontal shaft resting in suitable bearings (not shown). This shaft is to receive motion from the band pulley, B, and said pulley is to receive motion from the band, A.

A hub, D, surrounds the end of the shaft, J, and is fixed an said shaft by a key, $D^1$. Said hub has a cylindrical extension, $D^3$, which is in axial alignment with the shaft, J. The opposite end of the hub, D, has a radial flange, $D^4$, the right hand face of which is a continuation of the right hand face of the hub. The pulley, B, loosely surrounds the right hand part of the hub, the pulley having an annular recess, $B^2$, which receives the flange, $D^4$, of the hub. Said flange prevents rightward movement of the pulley. At the left of the pulley the hub is surrounded by a retaining ring, C, which is fixed to the hub by a key, $D^2$, whereby it is made a part of the hub. The ring, C, has three horizontal apertures, $C^1$, which are equi-distant from each other and equi-distant from the axis of the shaft, J, and are adapted to register with three similarly located sockets, $B^1$, in the adjacent face of the pulley, B.

At the left of the retaining ring, a disk, E, having a central aperture, $E^1$, surrounds the extension, $D^3$, of the hub loosely so as to permit the sliding of the disk horizontally on said extension toward and from the retaining ring and the hub. On said disk are fixed three pins or fingers, $E^2$, which extend into the apertures, $C^1$, of the retaining ring and also into the sockets, $B^1$, of the pulley, B. When the free ends of the fingers, $E^2$, are in the sockets, $B^1$, the pulley will compel movement of the fingers around the axis of the shaft, J. That will compel the rotation of the ring, C, and the hub, D. Since as above described, the hub, is keyed to the shaft, J, said shaft must now rotate with said hub and ring.

The left hand or outer end of the extension, $D^3$, of the hub is screw threaded and a nut, F, is placed on the threaded part of said extension. Between said nut and the disk, E, said extension is surrounded by an expanding coil spring, $F^1$, which bears against said nut and the disk, E. Normally the nut is stationary, while the disk, E, may be pressed leftward against the yielding resistance of the spring.

A housing, G, surrounds said nut and spring and has in its left hand part an aperture, $G^3$, into which extends the outer end of said extension, said aperture being large enough to avoid engagement between the housing and the extension, $D^3$. Said housing has an outward-directed flange, $G^1$, which rests against the left hand face of the disk, E. Screws, $G^2$, extend through said flange and into said disk, whereby the housing is bound immovably to said disk so that it must move in unison with the disk, E. When the housing has been removed, the nut, F, may be adjusted toward and from the body of the hub by turning the nut in the appropriate direction, whereby the pressure of the spring, $F^1$, is varied. On the interior of the housing is a lug, $G^4$, which can move into position over one of the faces of the nut when the housing is moved into position after the nut has been adjusted. When in such position, the lug prevents the turning of the nut.

At the right of the hub, D, a disk, H, loosely surrounds the shaft, J. On said disk are three rigid fingers, $H^1$, spaced equi-distant from each other and from the axis of said shaft and resting slidably in apertures, D⁵, extending horizontally through the hub, D. Said fingers are long enough to bear against the disk, E, while the disk, H, is away from the hub, D, a distance equal to the distance the fingers, E², penetrate the sockets, B¹, of the pulley, B, when the fingers, E², are in the working position. The pulley is cut away at B³ to allow the disk, H, to bear against the hub, D, without bearing against the pulley.

A forked lever, I, is pivoted at I², and has arms, I¹, which stand at opposite sides of the shaft, J, in position to bear against the right hand face of the disk, H, near the rim of said disk.

The operation is as follows:

In the absence of pressure by the lever, I, on the disk, H, the spring, F¹, presses the disk, E, toward the ring, C, and the body of the hub, D, whereby the free ends of the fingers, E², are made to bear against the adjacent face of the pulley, B, until the sockets, B¹, are, by the rotation of the pulley brought into position to receive said fingers. As soon as said fingers enter said sockets, the fingers, the disk, E, the hub, D, and the shaft J, turn in unison with the pulley. This movement continues until the lever, I, is moved to make the arms, I¹, bear against the disk, H, whereby said disk is moved toward the hub, D. Such movement of said disk forces the fingers, H, against the disk, E, whereby that disk is forced away from the ring, C, and the body of the hub, D. Such movement of the disk, E, causes the disk to draw the fingers, E², in the same direction until they have been retracted out of the sockets, B¹, of the pulley, B. As soon as that occurs, the pulley is free to turn without turning the hub, D. While such disengagement is being effected by the pressure of the arms of the lever, I, such pressure also acts as a brake to retard the turning of the disk, H. Thus the lever, I, serves the double purpose of releasing the ring, C, hub, D, and the shaft, J, and make a brake application to bring the shaft, J, and the hub, D, and other parts supported by said hub quickly to rest.

I claim as my invention,

1. In a clutch of the nature described, a shaft, a hub fixed on said shaft, a pulley loosely surrounding said hub, two disks on the axial line of said shaft at opposite sides of the hub and movable parallel to the shaft axis, the first of said disks bearing fingers directed toward the other of said disks and adapted to have their ends engage the pulley, yielding means tending to press said disk toward the pulley, and the second of said disks having fingers extending through the hub and adapted to bear against the first disk, and means to be actuated by power extraneous to the clutch for pressing the second disk toward the first disk with sufficient force to overcome said yielding means, whereby the first disk is pressed away from the pulley and the fingers of said disk are disengaged from the pulley, substantially as described.

2. In a clutch of the nature described, a shaft, a hub fixed on said shaft and having two flanges, a pulley loosely surrounding said hub between said flanges, two disks on the axial line of said shaft at opposite sides of the hub and movable parallel to the shaft axis, the first of said disks bearing fingers directed toward the other of said disks and adapted to have their ends engage the pulley, yielding means tending to press said disk toward the pulley, and the second of said disks having fingers extending through the hub and adapted to bear against the first disk, and means to be actuated by power extraneous to the clutch for pressing the second disk toward the first disk with sufficient force to overcome said yielding means, whereby the first disk is pressed away from the pulley and the fingers of said disk are disengaged from the pulley, substantially as described.

3. In a clutch of the nature described, a shaft, a hub fixed on said shaft and having two flanges, a pulley loosely surrounding said hub between said flanges, two disks on the axial line of said shaft and movable parallel to the shaft axis, the first of said disks bearing fingers directed toward the other of said disks and in sliding engagement with the adjacent flange and adapted to have their ends engage the pulley, yielding means tending to press said disk toward the pulley, and the second of said disks having fingers extending through the hub and adapted to bear against the first disk, and means to be actuated by power extraneous to the clutch for pressing the second disk toward the first disk with sufficient force to overcome said yielding means, whereby the first disk is pressed away from the pulley and the fingers of said first disk are disengaged from the pulley, substantially as described.

4. In a clutch of the nature described, a shaft, a hub fixed on said shaft and having two flanges, a pulley loosely surrounding said hub between said flanges, two disks on the axial line of said shaft and movable parallel to the shaft axis, the first of said disks bearing fingers directed toward the other of said disks and extending slidably through the adjacent flange and adapted to have their ends engage the pulley, yielding means tending to press said disk toward the pulley, and the second of said disks having fingers extending through the hub and adapted to bear against the first disk, and means to be actuated by power extraneous to the clutch for pressing the second disk toward the first disk with sufficient force to overcome said yielding means, whereby the first disk is pressed away from the pulley and the fingers of said disk are disengaged from the pulley, substantially as described.

5. In a clutch of the nature described, a shaft, a hub fixed on said shaft and having an extension in axial alignment with said shaft, a pulley loosely surrounding said hub, two disks on the axial line of said shaft and movable parallel to the shaft axis, the first of said disks bearing fingers directed toward the other of said disks and adapted to have their ends engage the pulley, a spring surrounding said extension and tending to press said disk toward the pulley, and the second of said disks having fingers extending through the hub and adapted to bear against the first disk, and means to be actuated by power extraneous to the clutch for pressing the second disk toward the first disk with sufficient force to overcome said spring, whereby the first disk is pressed away from the pulley and the fingers of said disks are disengaged from the pulley, substantially as described.

6. In a clutch of the nature described, a shaft, a hub fixed on said shaft and having an extension in axial alignment with said shaft, a pulley loosely surrounding said hub, two disks on the axial line of said shaft and movable parallel to the shaft axis, the first of said disks bearing fingers directed toward the other of said disks and adapted to have their ends engage the pulley, a nut on said extension, a spring surrounding said extension between said nut and said disk and tending to press said disk toward the pulley, and the second of said disks having fingers extending through the hub and adapted to bear against the first disk, and means to be actuated by power extraneous to the clutch for pressing the second disk toward the first disk with sufficient force to overcome said spring, whereby the first disk is pressed away from the pulley and the fingers of said disks are disengaged from the pulley, substantially as described.

7. In a clutch of the nature described, a shaft, a hub fixed on said shaft and having an extension in axial alignment with said shaft, a pulley loosely surrounding said hub, two disks on the axial line of said shaft and movable parallel to the shaft axis, the first of said disks bearing fingers directed toward the other of said disks and adapted to have their ends engage the pulley, a nut on said extension, a spring surrounding said extension between said nut and said disk and tending to press said disk toward the pulley, a housing supported by the first disk and enclosing said spring and nut, and the second of said disks having fingers extending through the hub and adapted to bear against the first disk, and means to be actuated by power extraneous to the clutch for pressing the second disk toward the first disk with sufficient force to overcome said spring, whereby the first disk is pressed away from the pulley and the fingers of said disks are disengaged from the pulley, substantially as described.

8. In a clutch of the nature described, a shaft, a hub fixed on said shaft and having an extension in axial alignment with said shaft, a pulley loosely surrounding said hub, two disks on the axial line of said shaft and movable parallel to the shaft axis, the first of said disks bearing fingers directed toward the other of said disks and adapted to have their ends engage the pulley, a nut on said extension, a spring surrounding said extension between said nut and said disk and tending to press said disk toward the pulley, a housing supported by the first disk and enclosing said spring and nut and engaging the nut, and the second of said disks having fingers extending through the hub and adapted to bear against the first disk, and means to be actuated by power extraneous to the clutch for pressing the second disk toward the first disk with sufficient force to overcome said spring, whereby the first disk is pressed away from the pulley and the fingers of said disks are disengaged from the pulley, substantially as described.

9. In a clutch of the nature described, a shaft, a wheel-form member surrounding the axial line of the shaft and rotatable relative to said shaft and having sockets on one side, means held for rotation with the shaft at that side of the wheel-form member and adapted to engage in said sockets, yielding means pressing said engaging means toward the wheel-form member, shifting means mounted for rotation with the shaft and movable parallel to said shaft toward said engaging member to press the latter away from the wheel-form member in opposition to said yielding means, and a controlling member free from the shaft relative to rotation and adapted to bear parallel to the shaft against the shifting means whereby the shifting means is made to press the engaging means away from the wheel-form member in opposition to said yielding means and a braking action tending to stop rotation is exerted on the shifting means, substantially as described.

10. In a clutch, a shaft, a hub fixed on said shaft, a wheel-form member surrounding the hub and rotatable relative to the hub and having sockets on one side, means held for rotation with the shaft at that side of the wheel-form member and adapted to engage in said sockets, yielding means pressing said engaging means toward the wheel-form member, shifting means mounted for rotation with the shaft and movable parallel to said shaft toward said engaging member to press the latter away from the wheel-form member in opposition to said yielding means, and a controlling member free from the shaft relative to rotation and adapted to bear parallel to the shaft against the shifting means whereby the shifting means is made to press the engaging means away from the wheel-form member in opposition to said yielding means and a braking action tending to stop rotation is exerted on the shifting means, substantially as described.

In testimony whereof I have signed my name, this 25th day of March, in the year one thousand nine hundred and twenty one.

JAMES G. BAILEY.